(12) United States Patent
Yamanaka et al.

(10) Patent No.: US 11,794,600 B2
(45) Date of Patent: Oct. 24, 2023

(54) VEHICLE AND CONTROL METHOD OF VEHICLE

(71) Applicant: TOYOTA JIDOSHA KABUSHIKI KAISHA, Toyota (JP)

(72) Inventors: Yuichiroh Yamanaka, Toyota (JP); Keiji Kaita, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 17/365,398

(22) Filed: Jul. 1, 2021

(65) Prior Publication Data

US 2022/0055497 A1 Feb. 24, 2022

(30) Foreign Application Priority Data

Aug. 20, 2020 (JP) ................. 2020-139412

(51) Int. Cl.
*B60L 53/62* (2019.01)
*B60L 58/12* (2019.01)
*H02J 7/00* (2006.01)

(52) U.S. Cl.
CPC .............. *B60L 53/62* (2019.02); *B60L 58/12* (2019.02); *H02J 7/0048* (2020.01); *B60L 2240/54* (2013.01); *B60L 2250/12* (2013.01)

(58) Field of Classification Search
CPC ...... B60L 53/62; B60L 58/12; B60L 2240/54; B60L 2250/12; B60L 58/13; B60L 2240/80; B60L 2250/16; B60L 53/14; B60L 58/16; H02J 7/0048; H02J 7/02; H02J 2310/48; H02J 7/0047; Y02T 90/12; Y02T 10/70; Y02T 10/7072; Y02T 90/14; B60W 40/08

USPC ........................................ 320/109
See application file for complete search history.

(56) References Cited

U.S. PATENT DOCUMENTS

2020/0055420 A1* 2/2020 Peer ................. B60L 53/62
2020/0262307 A1* 8/2020 Rosene .............. B60L 58/12
2022/0289056 A1* 9/2022 Saita ................. B60L 53/62

FOREIGN PATENT DOCUMENTS

JP 2013-062945 A 4/2013
JP 2018-120352 A 8/2018

* cited by examiner

*Primary Examiner* — Paul Dinh
(74) *Attorney, Agent, or Firm* — Oliff PLC

(57) ABSTRACT

A vehicle is configured to be charged with power supplied from the outside. The vehicle includes a storage battery, an interface configured to present a driver with power information on a state of charge of the storage battery, a monitoring device configured to monitor the driver and detect a confirmation operation of the driver for the interface, and a control device configured to complete, when the state of charge of the storage battery reaches a predetermined value during charging, the charging. The control device determines the predetermined value based on the state of charge of the storage battery calculated according to a detection frequency of the confirmation operation by the monitoring device.

7 Claims, 6 Drawing Sheets

VEHICLE AND CONTROL METHOD OF VEHICLE

CROSS-REFERENCE TO RELATED APPLICATION

This application claims priority to Japanese Patent Application No. 2020-139412 filed on Aug. 20, 2020, incorporated herein by reference in its entirety.

BACKGROUND

1. Technical Field

The present disclosure relates to a vehicle and a control method of the vehicle, and more specifically, to a vehicle that enables a storage battery mounted thereon to be charged with power supplied from an outside power supply, and a control method of the vehicle.

2. Description of Related Art

Recently, a plug-in hybrid vehicle (PHV) and an electric vehicle (EV) have become widely used. These vehicles are configured to enable storage batteries mounted thereon to be charged with power supplied from the outside of the vehicles.

Deterioration of a storage battery progresses according to a usage mode of a vehicle. In particular, the charging mode of the storage battery may influence the degree of deterioration of the storage battery. Therefore, a method has been proposed in which deterioration of a storage value is considered when the storage battery is charged. For example, a charge control device disclosed in Japanese Unexamined Patent Application Publication No. 2013-062945 enables a charging of a storage battery in which a traveling distance of a vehicle is prioritized according to a deterioration state of the storage battery.

SUMMARY

Generally, when time elapses in a state of a high state of charge (SOC), such as a state in which a storage battery is nearly fully charged, the storage battery deteriorates and the life of the storage battery is shortened. Therefore, in order to restrain the deterioration of the storage battery, it is desirable that the SOC of the storage battery does not become excessively high.

On the other hand, the lower the SOC of the storage battery is, the shorter the traveling range (a so-called EV distance) of the vehicle becomes. In terms of the psychology of a driver, in order to secure a long traveling range, it is considered that he/she desires to have a sense of security by executing external charging until the SOC becomes as high as possible.

As such, in association with the charging of the storage battery, there is a difficult relationship (a trade-off relationship) between the restraining of the deterioration of the storage battery and the driver's having a sense of security.

The present disclosure provides a vehicle that restrains deterioration of a storage battery while giving a sense of security to a driver, and a control method of the vehicle.

A first aspect of the present disclosure is a vehicle configured to be charged with power supplied from an outside power supply. The vehicle includes a storage battery, an interface configured to present a driver with power information on a SOC of the storage battery, a monitoring device configured to monitor the driver and detect a confirmation operation of the driver for the interface, and a control device configured to, when the SOC of the storage battery reaches a predetermined value during charging, complete the charging. The control device is configured to determine the predetermined value based on the SOC of the storage battery calculated according to a detection frequency of the confirmation operation by the monitoring device.

In the first aspect, the control device may determine the predetermined value based on the SOC of the storage battery when the detection frequency exceeds a reference value.

In the first aspect, the control device may determine the predetermined value based on the SOC of the storage battery calculated according to the detection frequency and the SOC corresponding to a power consumption amount between two charges in the vehicle.

In the first aspect, the interface may be a display configured to display the power information. The monitoring device may include a camera configured to capture an image of a face of the driver that views the display, and an image processing unit configured to analyze the image captured by the camera and traces movement of a line of sight of the driver to the display.

In the first aspect, the monitoring device may include a navigation device. The navigation device may detect an operation in which the driver searches for charging facilities used for executing the charging as the confirmation operation.

In the first aspect, the interface may present the driver with information on a current SOC of the storage battery, information on the predetermined value, and information on an upper limit SOC up to which the storage battery can be charged.

In the above configuration, the storage battery is charged until the SOC thereof becomes slightly higher (preferably, by the SOC corresponding to the power consumption amount between two consecutive charges) than the SOC at which the driver is concerned about a remaining capacity of the storage battery and executes the confirmation operation. When the battery is charged up to that SOC level, there is a high possibility that the SOC of the storage battery will not excessively decrease, either when the vehicle is used next time, and the remaining capacity of the storage battery will not be insufficient. In addition, since the amount of an increase in the SOC of the storage battery is lower than that when the storage battery is fully charged, a deterioration rate of the storage battery can be slowed down. Therefore, with the configuration, it is possible to restrain the deterioration of the storage battery while giving a sense of security to the driver.

A second aspect of the present disclosure is a control method of a vehicle configured to be charged with power supplied from an outside power supply. The control method includes a step of completing, when a SOC of a storage battery of the vehicle reaches a predetermined value during charging, the charging, a step of detecting, by a monitoring device, a confirmation operation of a driver for an interface, and a step of determining the predetermined value based on the SOC of the storage battery calculated according to a detection frequency of the confirmation operation. The monitoring device is configured to monitor the driver and the interface is configured to present the driver with the power information on the SOC of the storage battery.

In the same manner as the vehicle according to the first aspect, with the method according to the second aspect, it is possible to restrain the deterioration of the storage battery while giving a sense of security to the driver.

With each aspect of the present disclosure, it is possible to restrain deterioration of a storage battery while giving a sense of security to a driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
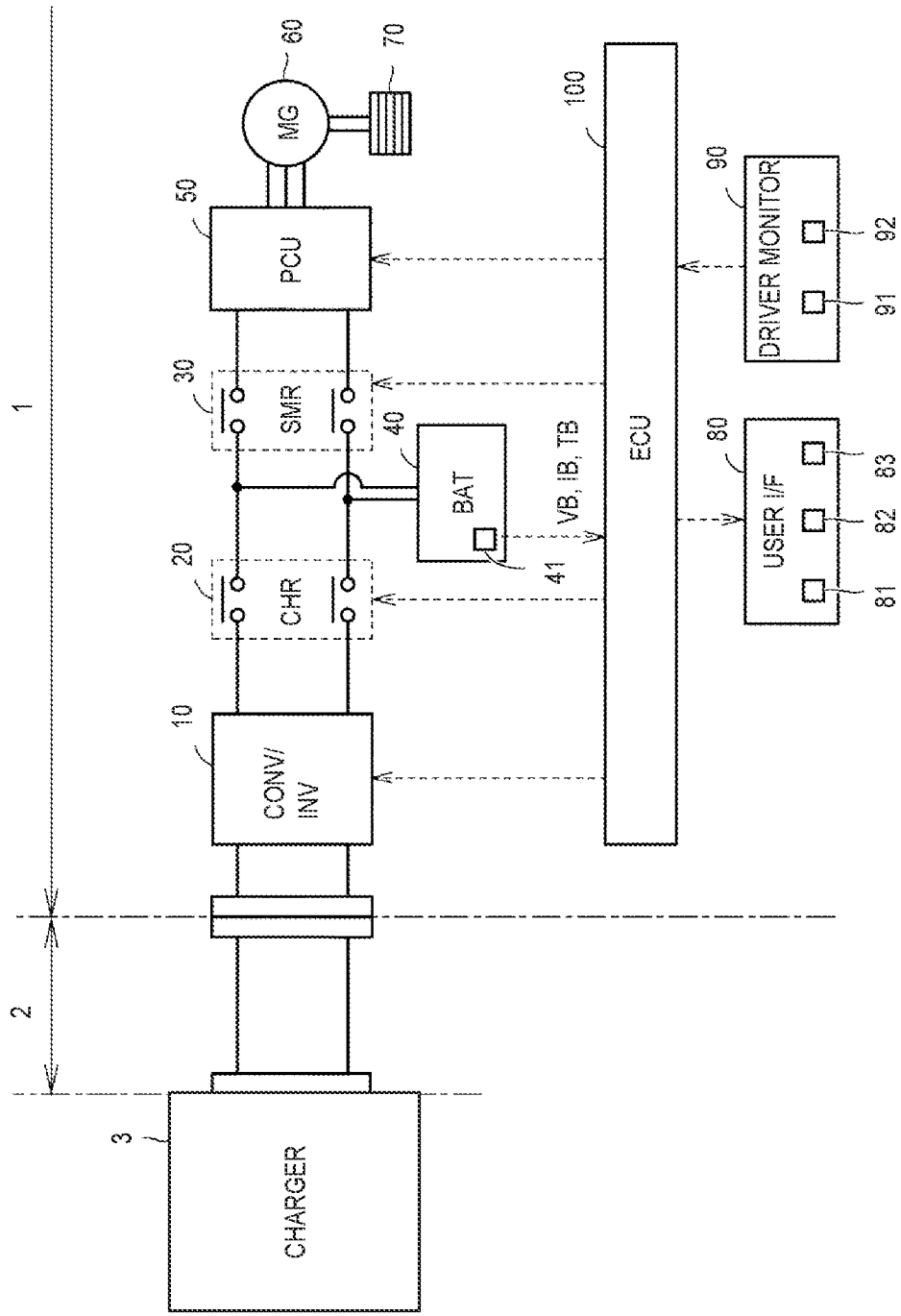
FIG. 1 is a diagram schematically illustrating an entire configuration of a vehicle according to the present embodiment.

Hereinafter, an embodiment of the present disclosure will be described in detail with reference to drawings. The same or corresponding components in the drawings are denoted by the same reference signs, and the description thereof will not be repeated.

Embodiments

Configuration of Vehicle

FIG. 1 is a diagram schematically illustrating an entire configuration of a vehicle according to the present embodiment. With reference of FIG. 1, a vehicle 1 is an electric vehicle (EV) in this example and is configured to be electrically connected to a charger (charge equipment) 3 via a charge cable 2. However, the vehicle 1 is a vehicle that can be charged (externally charged) by power supplied from the charger 3 via the charge cable 2, and may be, for example, a plug-in hybrid vehicle (PHV).

The vehicle 1 includes a power converter 10, a charge relay (CHR) 20, a system main relay (SMR) 30, a battery 40, a power control device (a power control unit, PCU) 50, a motor generator 60, a drive wheel 70, a user interface 80, a driver monitor 90, and an electronic control device (an electronic control unit, ECU) 100.

The power converter 10 includes, for example, an alternating current (AC)/direct current (DC) converter (not shown). The power converter 10 converts the alternating current power supplied from the charger 3 via the charge cable 2 into direct current power and outputs it to the CHR 20. Instead of the AC/DC converter, the power converter 10 may include a DC/DC converter (not shown) used for executing quick charging.

The CHR 20 is electrically connected to a power line that connects the battery 40 and the power converter 10. The CHR 20 switches between supplying and shutting off power between the battery 40 and the power converter 10 according to a control signal from the ECU 100.

The SMR 30 is electrically connected to a power line that connects the PCU 50 and the battery 40. The SMR 30 switches between supplying and shutting off power between the PCU 50 and the battery 40 according to a control signal from the ECU 100.

The battery 40 may be a storage battery configured to be chargeable and dischargeable. As the battery 40, a secondary battery, such as a lithium-ion battery and a nickel-hydrogen battery, can be used. The battery 40 supplies the PCU 50 with power for generating a driving force of the vehicle 1. Further, the battery 40 stores the power generated by the motor generator 60.

The battery 40 includes a battery sensor 41 that monitors a state of the battery 40. The battery sensor 41 includes a voltage sensor that detects a voltage VB of the battery 40, a current sensor that detects a current D3 input to and output from the battery 40, and a temperature sensor that detects the temperature TB of the battery 40 (none shown). Each sensor outputs a signal indicating a detection result to the ECU 100. The ECU 100 can calculate the SOC of the battery 40 based on the detection results of the voltage sensor and the current sensor.

The PCU 50 converts the direct current power stored in the battery 40 into alternating current power and supplies it to the motor generator 60 according to a control signal from the ECU 100. Further, the PCU 50 converts the alternating current power generated by the motor generator 60 into direct current power and supplies it to the battery 40.

The motor generator 60 may be an alternating current rotating electric machine, such as a permanent magnet-type synchronous motor including a rotor in which a permanent magnet is embedded. Output torque of the motor generator 60 is transmitted to the drive wheels 70 to cause the vehicle 1 to travel. Further, the motor generator 60 can generate power by a rotational force of the drive wheels 70 during a braking operation of the vehicle 1. The power generated by the motor generator 60 is converted into charging power of the battery 40 by the PCU 50.

The user interface 80 presents the driver with various kinds of information on the vehicle 1 according to a control signal of the ECU 100. In the present embodiment, the user interface 80 is used to present the driver with power information on the SOC of the battery 40. Specifically, the user interface 80 includes an instrument panel 81, a head-up display (HUD) 82, and a navigation screen 83.

The driver monitor 90 monitors the driver sitting in the driver's seat and outputs a monitoring result to the ECU 100. In the present embodiment, the driver monitor 90 is used to detect the driver's confirmation operation on the user interface 80.

Specifically, the driver monitor 90 includes an in-vehicle camera 91 and an image processing unit 92. Configurations of the user interface 80 and the driver monitor 90 will be described in detail with reference to FIG. 2.

The ECU 100 includes a processor, such as a central processing unit (CPU), a memory, such as a read-only memory (ROM) and a random access memory (RAM), and an input/output port (none shown). The ECU 100 may be divided into a plurality of ECUs for each function. The ECU 100 controls each device such that the vehicle 1 is in a desired state based on an input of a signal from each sensor and a map and a program stored in the memory. For example, the vehicle 1 controls an external charging operation from the charger 3 to the vehicle 1 by outputting a control signal to the power converter 10. An example of a main control executed by the ECU 100 in the present embodiment is a process for determining a SOC (a charging complete SOC) at which charging of the battery 40 is completed at the time of the external charging. This process will be described below in detail.

User I/F and Driver Monitor

Figure 2:
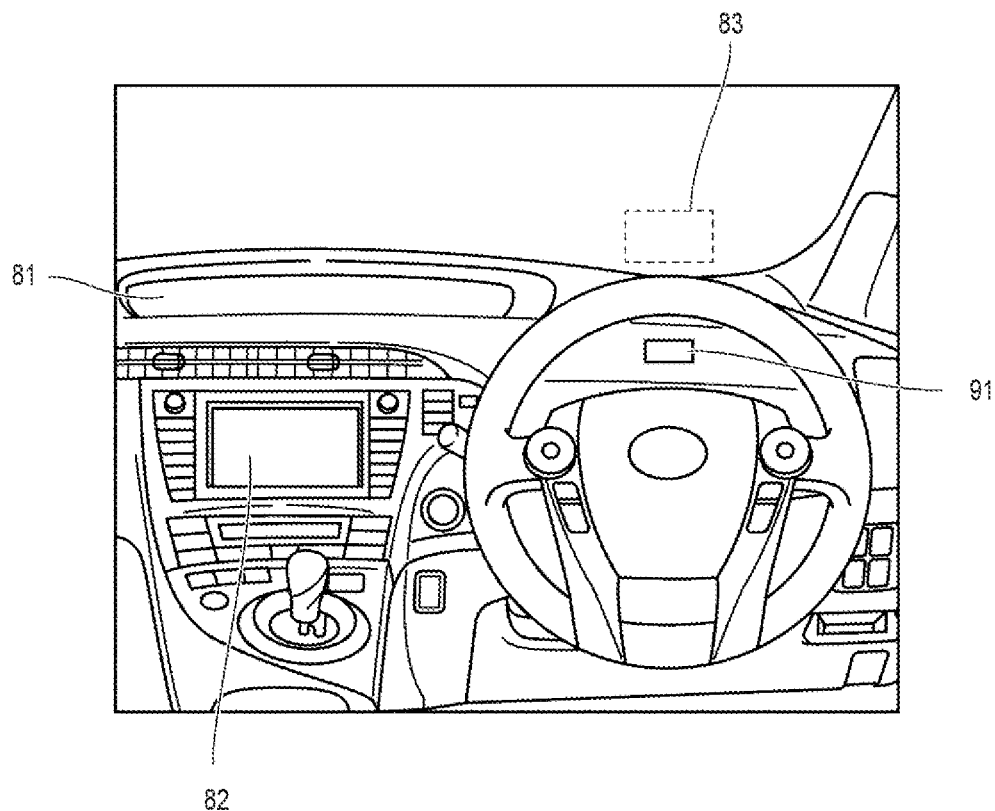
FIG. 2 is a diagram illustrating examples of configurations of a user interface and a driver monitor.

FIG. 2 is a diagram illustrating examples of configurations of the user interface 80 and the driver monitor 90. With reference to FIG. 2, the instrument panel 81 has meters installed thereon, and displays various states of the vehicle 1 according to a control by the ECU 100. More specifically, the instrument panel 81 displays the SOC of the battery 40 in addition to displaying a speedometer, a tachometer, a fuel gauge, a water temperature gauge, a trip meter, and a warning light. Instead of the instrument panel 81, a multi-information display may be used.

The HUD 82 projects various kinds of information as a virtual image in front of the driver's field of view. The HUD 82 also displays a vehicle speed of the vehicle 1, the traveling direction to a destination, a traffic sign, and the like. The SOC of the battery 40 may be displayed on the HUD 82.

The navigation screen 83 may be a display of a navigation system (not shown) arranged inside the instrument panel 81. The navigation system includes a global positioning system (GPS) receiver used for locating the vehicle 1 based on radio waves from an artificial satellite (not shown). The navigation system displays a current position of the vehicle 1 and a recommended route toward the destination of the vehicle 1 on the navigation screen 83 based on GPS information of the vehicle 1 and road map data stored in the memory (not shown). The navigation screen 83 may be a monitor with a touch panel (neither shown). The SOC of the battery 40 can also be displayed on the navigation screen 83.

The instrument panel 81, the HUD 82, and the navigation screen 83 correspond to the "display" according to the present disclosure. However, the "display" is not limited thereto, and may be a display separately provided for displaying the SOC of the battery 40.

In the example illustrated in FIG. 2, the in-vehicle camera 91 is installed at the top of a steering column. The in-vehicle camera 91 captures an image of the driver's face at an angle looking up from below and outputs the captured image to the image processing unit 92. An installation position of the in-vehicle camera 91 is not particularly limited, and may be, for example, in the vicinity of a rear-view mirror.

The image processing unit 92 (see FIG. 1) includes, for example, a dedicated processor used for facial image recognition. The image processing unit 92 is configured to be capable of detecting (tracing) the movement of the driver's line of sight by analyzing the image of the driver's face.

Deterioration of Battery and Driver's Having Sense of Security

Generally, as time elapses in a high SOC state, a battery deteriorates and the life of the battery is shortened. Therefore, in order to restrain the deterioration of the battery 40 in the vehicle 1, it is desirable that the SOC of the battery 40 does not become excessively high. On the other hand, the lower the SOC of the battery 40 is, the shorter an EV distance of the vehicle 1 becomes. In terms of the psychology of the driver, in order to secure a long EV distance, he/she desires to have a sense of security by executing the external charging of the battery 40 until the SOC becomes as high as possible.

Therefore, in the present embodiment, a configuration is employed in which the driver's line of sight is monitored by the driver monitor 90 and the charging complete SOC of the battery 40 is determined based on the degree to which the driver is concerned about the SOC of the battery 40. Hereinafter, the display of the power information on the SOC of the battery 40 on the user interface 80 is referred to as a "SOC display". The number of times that the driver views the SOC display is stated as a "view time N". Further, the number of times that the driver views the SOC display per unit time is stated as a "view frequency F". The view frequency F corresponds to a "detection frequency" according to the present disclosure.

View Frequency

Figure 3:
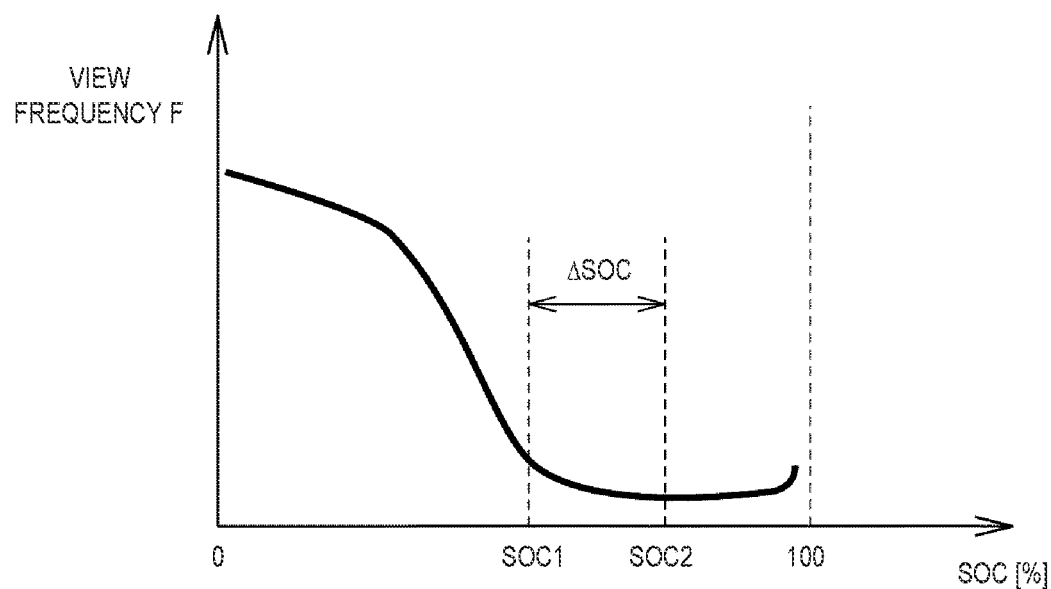
FIG. 3 is a conceptual diagram for describing a relationship between a state of charge (SOC) of a battery and a view frequency.

FIG. 3 is a conceptual diagram for describing a relationship between the SOC of the battery 40 and the view frequency F. In FIG. 3, the horizontal axis represents the SOC of the battery 40 and the vertical axis represents the view frequency F.

With reference to FIG. 3, many drivers are rarely concerned about a SOC of a battery when sufficient power is stored in the battery (that is, the SOC of the battery is sufficiently high). As the SOC of the battery decreases, a driver begins to be concerned about the SOC and the number of times that he/she views the SOC display increases.

However, the SOC at which the number of times that he/she views the SOC display begins to increase may vary depending on drivers. For example, one driver begins to be concerned about a decrease in SOC at SOC=50%. On the other hand, another driver is not concerned about a decrease in the SOC at 50% at all, and when the SOC decreases to approximately 30%, he/she begins to be concerned about the SOC.

The SOC at which the increase in the view frequency F of a driver of the vehicle 1 is remarkable is stated as a "SOC1". A calculation method of the SOC1 will be described in FIGS. 4 to 6.

A SOC corresponding to a normal power consumption amount by the driver of the vehicle 1 is stated as a "ΔSOC". In other words, the ΔSOC corresponds to a typical power consumption amount (for example, an average value of the power consumption amount) between the execution of the external charging and execution of a next external charging in the vehicle 1. When external charging of the vehicle 1 is executed every day, the ΔSOC corresponds to a daily power consumption amount.

Further, a SOC (the charging complete SOC) at which the charging of the battery 40 is completed is stated as a "SOC2". The SOC2 can be calculated by adding the ΔSOC to the SOC1 as represented by the following equation (1):

[Equation]

$$SOC2 = SOC1 + \Delta SOC \tag{1}$$

Calculation of SOC1

Figure 4:
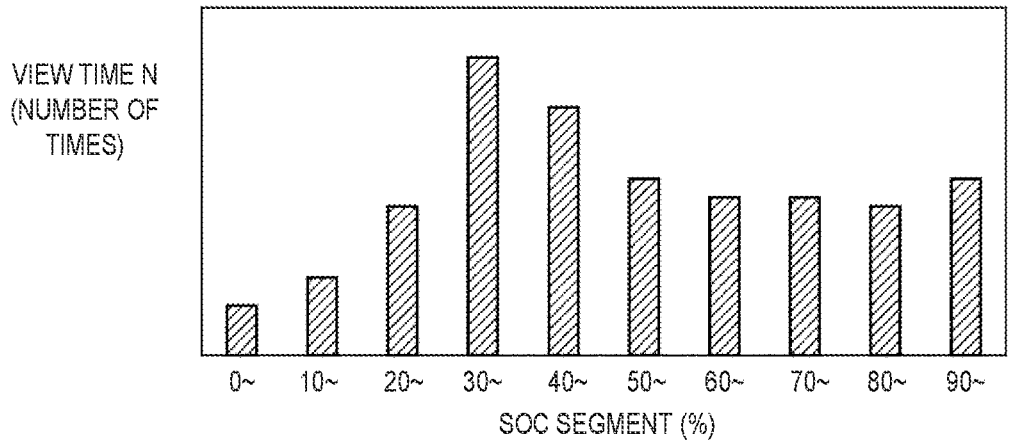
FIG. 4 is a diagram illustrating a measurement example of the number of times of view of a SOC display.
Figure 5:
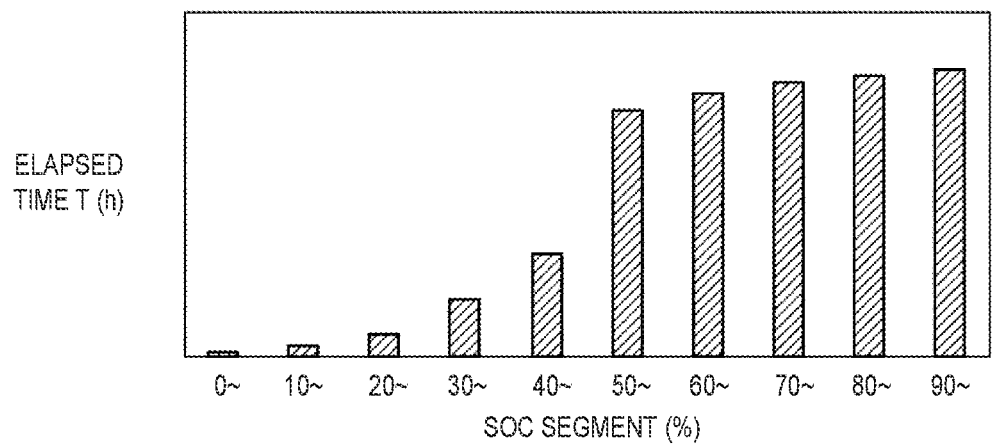
FIG. 5 is a diagram illustrating a measurement example of an elapsed time for each SOC.
Figure 6:
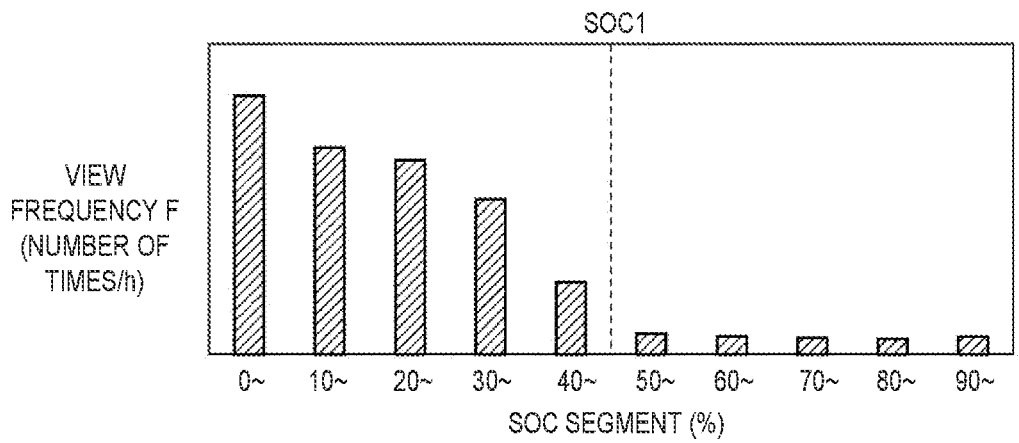
FIG. 6 is a diagram illustrating a measurement example of a view frequency of the SOC.

FIG. 4 is a diagram illustrating a measurement example of the view time N of the SOC display. In FIG. 4, and FIGS. 5 and 6 to be described below, the horizontal axis represents the SOC of the battery 40 which is divided into segments of 10%. The vertical axis of FIG. 4 represents the view time N (unit: number of times).

The driver's line of sight is monitored using the driver monitor 90. When the driver's line of sight is directed toward the SOC display for a certain period of time or longer, the ECU 100 determines that "the driver has viewed the SOC display". Then, the view time N is increased by one. The view time N measured in this manner is counted for each SOC segment of the battery 40 at the time of view as illustrated in FIG. 4.

FIG. 5 is a diagram illustrating a measurement example of an elapsed time T for each SOC. The vertical axis of FIG. 5 represents the elapsed time (unit: time). The elapsed time T is a value obtained by measuring the elapsed time while the driver is sitting in the driver's seat using a timer (not shown) and dividing a measurement result into the SOC segments of the battery 40.

FIG. 6 is a diagram illustrating a measurement example of the view frequency F of the SOC display. The vertical axis of FIG. 6 represents the view frequency F (unit: number of times per unit time). The view frequency F can be calculated by dividing the view time N illustrated in FIG. 4 by the elapsed time T illustrated in FIG. 5 for each SOC segment of the battery 40 (see the following equation (2)).

[Equation]

$$F=N/T \qquad (2)$$

The view frequency F is arranged in descending order of the SOC segments of the battery 40, and a SOC segment in which the increase in the view frequency F becomes remarkable can be designated as the SOC1. Here, "the increase in the view frequency F becomes remarkable" means that, for example, a difference between a view frequency F in a certain SOC segment and a view frequency F in a previous SOC segment thereof (a SOC segment higher by 1 segment) is equal to or greater than a reference value. Alternatively, instead of the difference, a ratio may be used. In other words, "the increase in the view frequency F becomes remarkable" may mean that a ratio of a view frequency F in a certain SOC segment to a view frequency F in a previous SOC segment thereof is equal to or higher than a reference value. As represented by a dashed line in an example illustrated in FIG. 6, the increase in the view frequency F becomes remarkable between a SOC segment of 50% or higher and less than 60% and a SOC segment of 40% or higher and less than 50%. Therefore, SOC=50% can be set as the SOC1.

It is desirable to exclude a time during the external charging of the battery 40 from the elapsed time T. During the external charging, the SOC increases and it cannot be said that the driver is concerned about a decrease in the SOC. By excluding the time during the external charging, a substantial elapsed time T in a situation where the driver may be concerned about a decrease in the SOC is calculated. As a result, the accuracy of the view frequency F can be enhanced.

Further, in FIGS. 4 to 6, the SOC being divided into 10% segments is merely an example and the SOC segments can be set as appropriate. A narrower SOC segment of, for example, 5%, 3%, 2%, or 1% may be used. Conversely, a SOC segment of a percent wider than 10% can be used.

Control Flow

Figure 7:
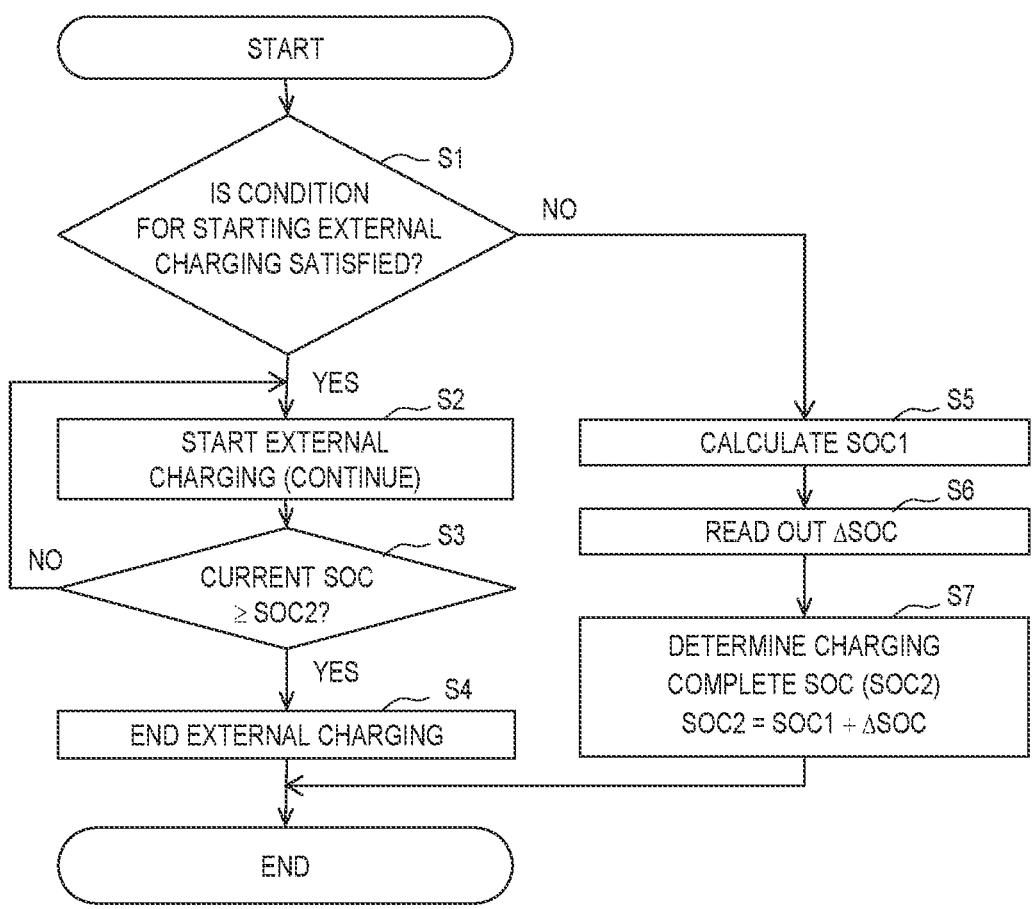
FIG. 7 is a flowchart illustrating an overview of a charge control in the present embodiment.

FIG. 7 is a flowchart illustrating an overview of a charge control in the present embodiment. This flowchart is repeatedly executed at, for example, calculation cycles determined in advance. Each step is implemented by software processing by the ECU 100, but may also be implemented by hardware (an electric circuit) manufactured in the ECU 100. Hereinafter, a step is abbreviated as "S".

With reference to FIG. 7, in S1, the ECU 100 determines whether a condition for starting the external charging of the vehicle 1 is satisfied. For example, when a connector of the charge cable 2 is connected to an inlet of the vehicle 1, the ECU 100 can determine that the condition for starting the external charging is satisfied. However, even in a case where the charge cable 2 is connected to the vehicle 1, when timer charging of the vehicle 1 is executed and a stand-by time equal to or longer than a predetermined time remains until a starting time of the timer charging, the ECU 100 may determine that the condition for starting the external charging is not satisfied.

When the condition for starting the external charging of the vehicle 1 is satisfied (YES in S1), the ECU 100 starts the external charging of the vehicle 1 (when the external charging has already been started, it is continued) (S2). During the external charging, the ECU 100 determines whether the current SOC of the battery 40 has reached the charging complete SOC (SOC2) (S3). When the current SOC is less than the charging complete SOC (NO in S3), the ECU 100 causes the process to return to S2 and continues the external charging. On the other hand, when the current SOC is equal to or higher than the charging complete SOC (YES in S3), the ECU 100 ends the external charging of the vehicle 1 (S4) and causes the process to return to the main routine. As described above, the charging complete SOC corresponds to a predetermined value according to the present disclosure.

On the other hand, in S1, when the condition for starting the external charging of the vehicle 1 is not satisfied (NO in S1), the ECU 100 causes the process to proceed to S5. In S5, the ECU 100 calculates the SOC1 at which the increase in the view frequency F becomes remarkable in the vehicle 1. A calculation of the SOC1 will be described in FIG. 8 below.

In S6, the ECU 100 reads out the ΔSOC from the memory (S6). The ΔSOC may be, for example, a value obtained by converting the amount of power, decreased from the battery 40 between two consecutive external charges, into the SOC. More specifically, for example, each time the external charging of the vehicle 1 is executed, the amount of power consumed between the previous external charging and the current external charging is calculated, and an average value of the power consumption amount within a predetermined period is updated. Then, in S6, the latest average value can be read out as the ΔSOC. However, it is not necessary to set the ΔSOC based on an actual history of the power consumption amount. The ΔSOC may be set by a user operation.

In S7, the ECU 100 determines the charging complete SOC (the SOC2) based on the SOC1 and the ΔSOC as described in the above equation (1).

When the condition for starting the external charging of the vehicle 1 is not satisfied (NO in S1), the ECU 100 repeatedly executes the processes S5 to S7 at predetermined calculation cycles. As such, the charging complete SOC is updated to the latest value.

Figure 8:
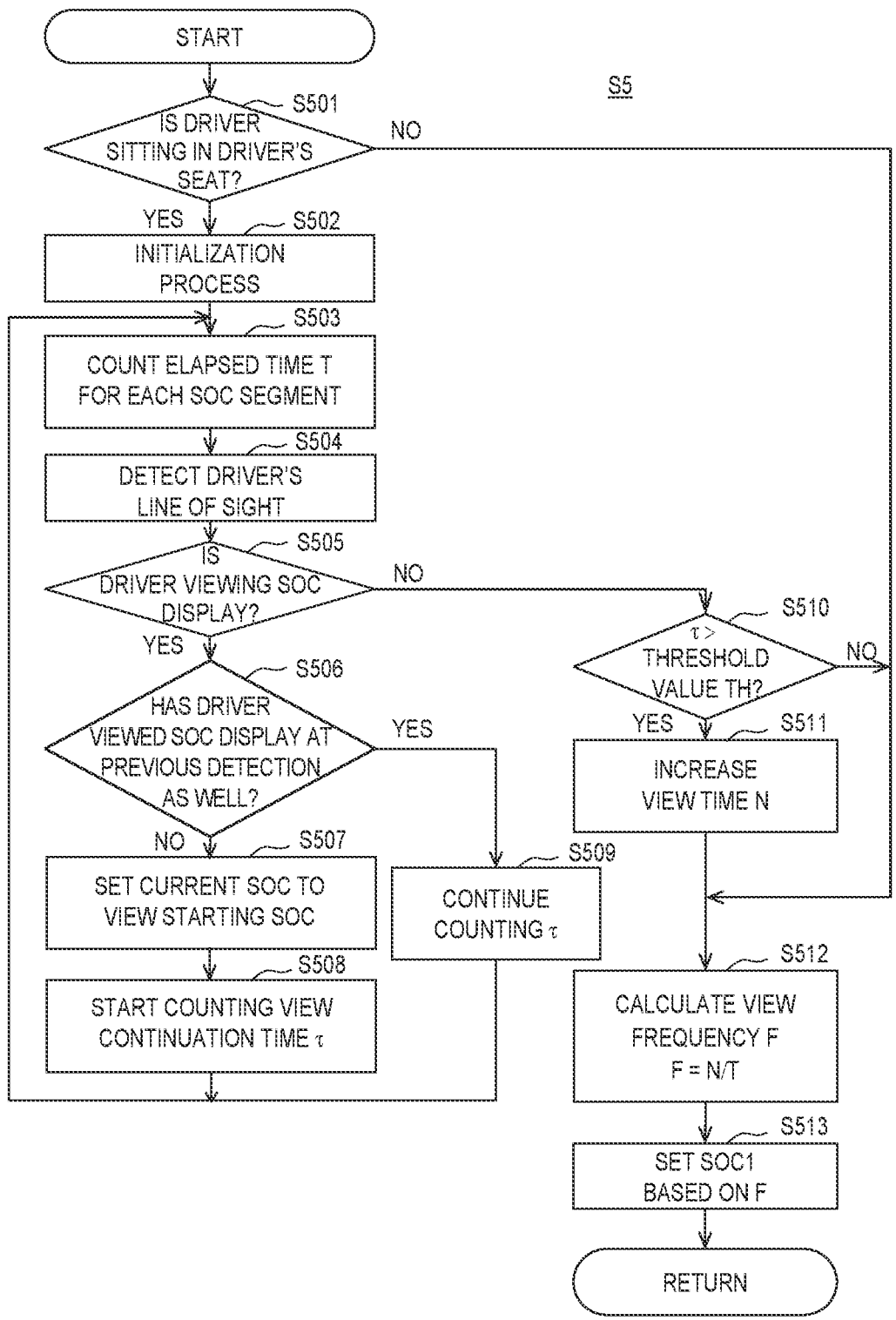
FIG. 8 is a flowchart illustrating a calculation process of a SOC at which an increase in the view frequency becomes remarkable.

FIG. 8 is a flowchart illustrating a calculation process (the process of S5) of the SOC (the SOC1) at which the increase in the view frequency F becomes remarkable. With reference to FIG. 8, in S501, the ECU 100 determines whether the driver is sitting in the driver's seat. Whether the driver is sitting in the driver's seat can be determined by using the driver monitor 90. In addition to the above, for example, the ECU 100 can determine, while the vehicle 1 is traveling (the vehicle speed>0), that the driver is sitting in the driver's seat. Further, even when the vehicle 1 is not traveling, the ECU 100 may determine that the driver is sitting in the driver's seat if a predetermined time has not elapsed after a starting switch (not shown) of the vehicle 1 is operated. Alternatively, the driver may be detected by a pressure sensor (a load sensor, not shown) installed in the driver's seat, or by a sensor (not shown) that detects wearing of a seat belt.

When the driver is not sitting in the driver's seat (NO in S501), the ECU 100 skips most of the following processes and causes the process to proceed to S512.

On the other hand, when the driver is sitting in the driver's seat (YES in S501), the ECU 100 executes an initialization process for setting the charging complete SOC (S502). Specifically, the ECU 100 clears a view starting SOC (to be described below) to zero. Further, the ECU 100 resets a view continuation time τ (to be described below).

In S503, the ECU 100 counts (starts counting) the elapsed time T in the SOC segment including the current SOC of the battery 40. The current SOC of the battery 40 can be calculated by a well-known method based on a signal from the battery sensor 41.

In S504, the ECU 100 detects the driver's line of sight by the driver monitor 90. Then, the ECU 100 determines whether the driver's line of sight is directed toward the SOC display (S505).

When the driver's line of sight is directed toward the SOC display (YES in S505), the ECU 100 determines whether the driver's line of sight has been directed toward the SOC display at the time of the previous detection of the driver's line of sight as well (S506).

On the other hand, when the driver's line of sight has not been directed toward the SOC display at the time of the previous detection of the driver's line of sight (NO in S506), that is, when the driver's line of sight is newly directed toward the SOC display at the time of the current detection of the driver's line of sight, the ECU 100 sets the current SOC to the view starting SOC (S507).

In addition, the ECU 100 starts counting (a time measurement) the view continuation time τ (S508).

On the other hand, when the driver's line of sight has been directed toward the SOC display at the time of the previous detection of the driver's line of sight as well in S506 (YES in S506), the ECU 100 continues counting the view continuation time τ in the SOC segment included in the current SOC (S509). After the execution of the process of S508 or S509, the ECU 100 causes the process to return to S503. Then, the ECU 100 repeatedly executes the processes of S503 to S509 while the driver's line of sight is directed toward the SOC display.

In S505, when the driver's line of sight is not directed toward the SOC display at the time of the current detection of the driver's line of sight (NO in S505), the ECU 100 causes the process to proceed to S510 and determines whether the view continuation time τ counted in S508 and S509 is longer than a predetermined threshold value TH. The threshold value TH is a time long enough for the driver to understand contents of the SOC display and may be, for example, about 1 second.

When the view continuation time τ is longer than the threshold value TH (YES in S510), it can be considered that the driver could understand the contents of the SOC display. Thus, the ECU 100 increases the view time N in the SOC segment including the view starting SOC (a set value of S507) by one (S511). Thereafter, the ECU 100 causes the process to proceed to S512.

On the other hand, when the view continuation time τ is equal to or shorter than the threshold value TH (NO in S510), the ECU 100 skips S511 (that is, without increasing the view time N) and causes the process to proceed to S512. This is because, when the view continuation time τ is equal to or shorter than the threshold TH, it is considered that the driver's line of sight has passed the SOC display and the driver has not consciously looked at the SOC display (thus, the driver cannot understand the contents of the SOC display).

In S512, the ECU 100 calculates the view frequency F in each SOC segment by dividing the view time N (a count value of S510) by the elapsed time T (a count value of S508) for each SOC segment of the battery 40 (see the above equation (2)).

In S513, the ECU 100 sets the SOC (the SOC1) at which the increase in the view frequency F by the driver of the vehicle 1 becomes remarkable based on the view frequency F calculated in S512. Since this method has been described in FIG. 4 in detail, the description thereof will not be repeated here. Thereafter, the ECU 100 causes the process to proceed to S6 of the flowchart illustrated in FIG. 7.

Advantageous Effect

Figure 9:
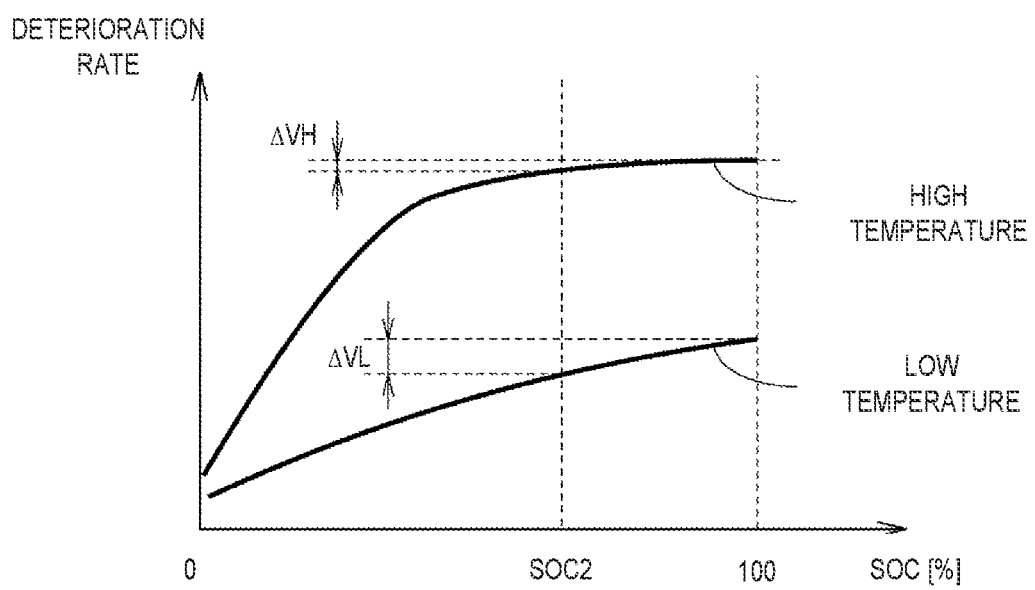
FIG. 9 is a diagram for describing an advantageous effect of the charge control according to the present embodiment.

FIG. 9 is a diagram for describing an advantageous effect of the charge control according to the present embodiment. In FIG. 9, the horizontal axis represents the SOC of the battery 40. The vertical axis represents a deterioration rate of the battery 40 (a deterioration amount per unit time), that is, the battery 40's susceptibility to the deterioration.

With reference to FIG. 9, as described above, the higher the SOC of the battery 40 is, the more susceptible to the deterioration the battery 40 is. Further, even in a case where the SOC is the same, the battery 40 is more susceptible to the deterioration when the temperature of the battery 40 is high than when the temperature of the battery 40 is low. According to the present embodiment, at the time of the external charging, the deterioration of the battery 40 can be restrained more when the increased SOC of the battery 40 is limited to the SOC2 than when the SOC of the battery 40 increases to 100%.

In FIG. 9, a deterioration restraining effect when the temperature of the battery 40 is high is represented by ΔVH and the deterioration restraining effect when the temperature of the battery 40 is low is represented by ΔVL.

As described above, in the present embodiment, the battery 40 is charged until the SOC becomes higher than the SOC (the SOC1) at which the driver begins to be concerned about a remaining capacity by the SOC consumption amount at the time of normal consumption (the ΔSOC). When the battery 40 is charged to this SOC level, there is a high possibility that the SOC of the battery 40 will not decrease to the vicinity of the SOC1, either at the time of a next normal consumption of the vehicle 1. Therefore, the driver does not have to have a sense of insecurity because the SOC of the battery 40 excessively decreases. In addition, by decreasing the amount of increase in the SOC of the battery 40, the deterioration rate of the battery 40 can be slowed down (see FIG. 9). Therefore, with the present embodiment, it is possible to restrain the deterioration of the storage battery 40 while giving a sense of security to the driver.

Further, the user interface 80 may further display not only the current SOC of the battery 40 but also the charging complete SOC (SOC2) and an upper limit SOC (typically 100%) up to which the battery 40 can be charged. As such, the driver can understand that the battery 40 is only charged to the SOC2 which is less than the upper limit SOC (that is, the battery 40 is not fully charged). As a result, it is possible to prevent the driver from misunderstanding that the battery 40 has not been sufficiently charged even though it should have been fully charged.

It is also possible to detect, using the navigation system, whether the driver is concerned about a decrease in the SOC of the battery 40. The driver who is concerned about a decrease in the SOC operates the navigation screen 83 with a touch panel and searches for the charger 3 (a charging spot) provided in the vicinity of the vehicle 1. The SOC of the battery 40 when the navigation screen 83 accepts a driver's operation of searching for a nearby charger 3 may be set as the SOC1.

Although not shown, the user interface 80 may include a smart speaker (an artificial intelligence (AI) speaker). The driver who is concerned about a decrease in the SOC asks the smart speaker an inquiry to check the current SOC. Therefore, the SOC of the battery 40 when such an inquiry is received from the driver can be set as the SOC1.

In the present embodiment, an example in which the vehicle 1 is an electric vehicle has been described. However, the vehicle 1 may be a PHV configured to be capable of motor traveling (so-called EV traveling). In this case, the vehicle 1 may be provided with an EV switch (not shown) that enables the driver to select whether to execute the EV traveling. The EV switch detects the driver's operation (an EV switch-off operation) for ending the EV traveling. Since the driver may be concerned about a decrease in the SOC of the battery 40 when the EV traveling is ended, the charging complete SOC may be determined by using the EV switch operation.

The embodiment disclosed herein needs to be considered as illustrative in all points and not restrictive. The scope of the present disclosure is shown not by the above description of the embodiments but by the claims, and is intended to include meanings equivalent to the claims and all modifications within the scope thereof.

What is claimed is:

1. A vehicle configured to be charged with power supplied from an outside power supply, the vehicle comprising:
    a storage battery;
    an interface configured to present a driver with power information on a state of charge of the storage battery;
    a monitoring device configured to monitor the driver and detect a confirmation operation of the driver for the interface; and
    a control device configured to, when the state of charge of the storage battery reaches a predetermined value during charging, complete the charging,
    wherein the control device is configured to determine the predetermined value based on the state of charge of the storage battery calculated according to a detection frequency of the confirmation operation by the monitoring device.

2. The vehicle according to claim 1, wherein the control device is configured to determine the predetermined value based on the state of charge of the storage battery when the detection frequency exceeds a reference value.

3. The vehicle according to claim 1, wherein the control device is configured to determine the predetermined value based on the state of charge of the storage battery calculated according to the detection frequency and the state of charge corresponding to a power consumption amount between two charges in the vehicle.

4. The vehicle according to claim 1, wherein:
    the interface is a display configured to display the power information; and
    the monitoring device includes:
        a camera configured to capture an image of a face of the driver that views the display; and
        an image processing unit configured to analyze the image captured by the camera and traces movement of a line of sight of the driver to the display.

5. The vehicle according to claim 1, wherein:
    the monitoring device includes a navigation device; and
    the navigation device is configured to detect an operation in which the driver searches for charging facilities used for executing the charging, as the confirmation operation.

6. The vehicle according to claim 1, wherein the interface is configured to present the driver with:
    information on a current state of charge of the storage battery;
    information on the predetermined value; and
    information on an upper limit state of charge up to which the storage battery is able to be charged.

7. A control method of a vehicle configured to be charged with power supplied from an outside power supply, the control method comprising:
    completing, when a state of charge of a storage battery of the vehicle reaches a predetermined value during charging, the charging;
    detecting, by a monitoring device, a confirmation operation of a driver for an interface, the monitoring device being configured to monitor the driver and the interface being configured to present the driver with power information on the state of charge of the storage battery; and
    determining the predetermined value based on the state of charge of the storage battery calculated according to a detection frequency of the confirmation operation.

* * * * *